March 23, 1937.  G. H. C. CORNER  2,074,368
APPARATUS FOR MAKING SLIDE FASTENERS
Filed Dec. 5, 1932
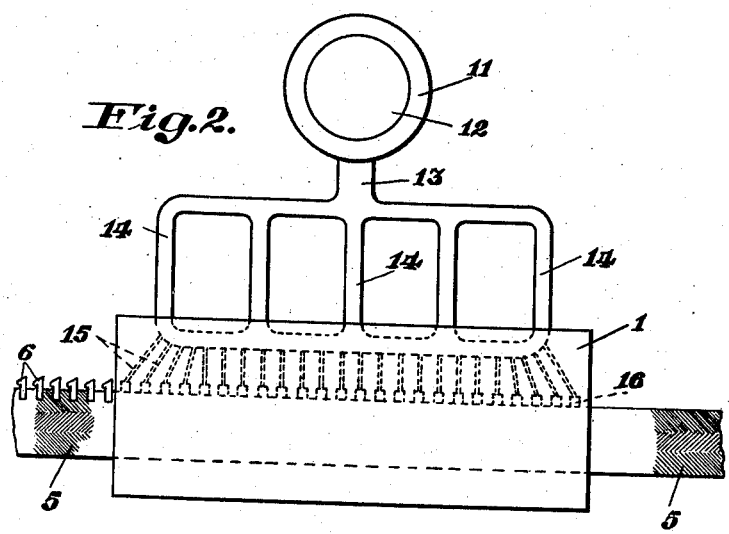
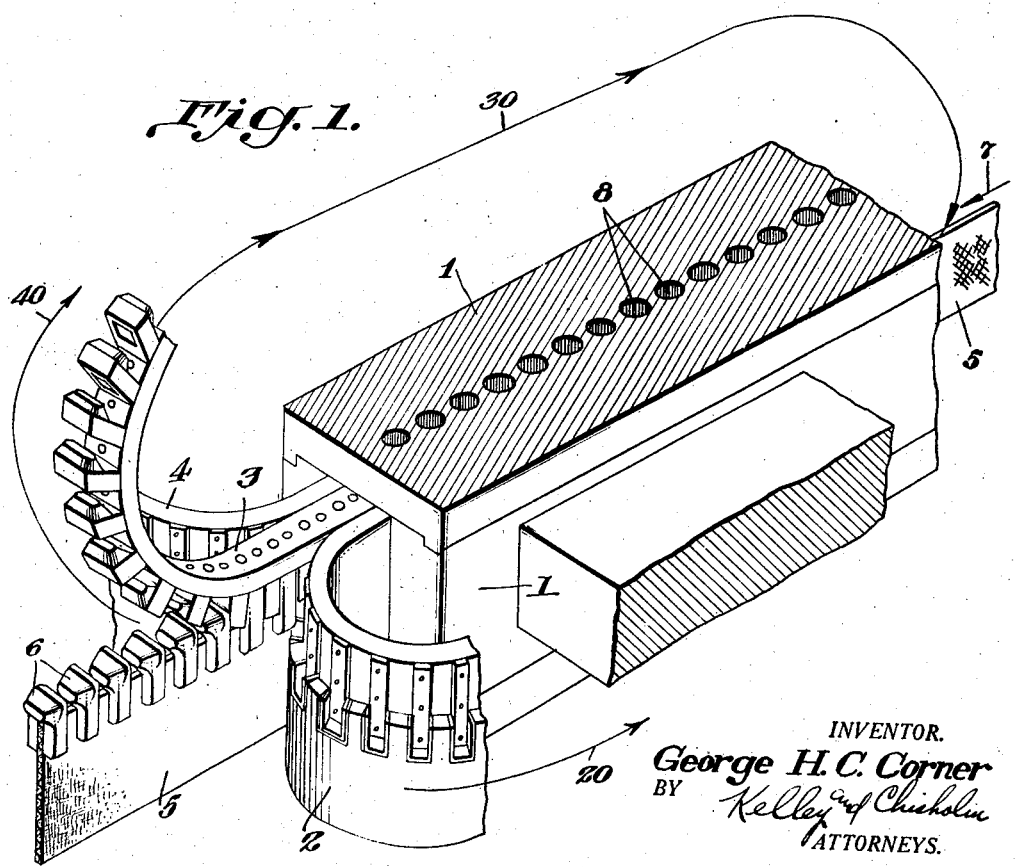
INVENTOR.
George H. C. Corner
BY Kelley and Chisholm
ATTORNEYS.

Patented Mar. 23, 1937

2,074,368

UNITED STATES PATENT OFFICE 2,074,368

APPARATUS FOR MAKING SLIDE FASTENERS

George H. C. Corner, Birmingham, England, assignor to Hookless Fastener Company, a corporation of Pennsylvania Application December 5, 1932, Serial No. 645,740
In Great Britain December 9, 1931

2 Claims. (Cl. 18—42)

This invention relates to the die casting or molding of small articles from metal, wax, artificial resin and the like, and its principal objects are to provide an improved method of and means for casting or molding small intricately shaped articles close together in a continuous or semi-continuous operation. The invention eliminates the necessity of designing the shape of the article to suit known die casting or molding processes.

The invention is particularly adapted for the manufacture of the coupling parts for slide operated fasteners, and especially those having non-metallic fastening elements. While metals of low melting point may be used in die casting processes for making such fasteners, I prefer to use non-metallic plastic materials. The coupling parts made of such materials are very strong and resistant to wear and can be produced in any desired color. Furthermore, they are smooth and warm to the touch and do not possess the mechanical appearance of metallic coupling parts.

The invention in its various aspects contemplates the use of a very wide range of materials coming within the term plastics. It includes thermo-hardening resinous materials for example, phenol condensation products; thermoplastic resins for example, cellulose acetate, ethyl cellulose, benzyl cellulose and other resins which do not require heat to harden; plastic casein and plastic shellac products may also be used after having been subjected to treatment so that they do not soften with a slight rise in temperature; rubber, containing sulphur or a compound having similar properties and mixed with other substances which determine the color of the product; and cold setting plastics for example, quick setting zinc oxychloride cement or the like.

The machine for practicing the invention may comprise a die or mold in combination with means for applying heat and pressure when the material requires such treatment, suitable means for supplying the die or mold with the desired material which may vary with the class of material used and preferably, automatic means for operating the dies to make the operation continuous or semi-continuous.

According to the invention, the die consists of two or more longitudinally extending sections at least one of which is flexible, the said sections being adapted to fit together and to form a number of small side by side compartments acting as dies or molds. By a flexible die section is meant a die component consisting of a plurality of die members connected by means allowing relative flexure, e. g. an integral or attached flexible member. The sections have a series of recesses and projections corresponding in shape to the articles to be molded and when the several sections are brought into register they are passed through a tunnel-shaped holder, the molding material being injected through openings in the casing of the die holder and into the dies. The molds having been filled the combined die sections are withdrawn from the end of the tunnel-shaped die holder and the flexible sections are separated by bending them outwardly away from one another, thus allowing the cast or molded articles to fall away from the dies. The process may be made continuous by leading the separated ends of the die sections back again to the other or entrance end of the tunnel-shaped die holder.

The flexible sections may be bands or strips of steel or other material having small pieces of metal (die members riveted and equally spaced thereon), the said die members being shaped to produce the desired shape of the fastener members and the bands which connect the die members being sufficiently flexible so that they may be bent in such a manner that the finished fastener may be withdrawn from same without damage; e. g. the sectional die members may be shaped like the dies shown in the pending United States application of William L. Gilmore Serial No. 565,781, filed September 29, 1931.

The small die members may be integral with the bands or strips and in this case one face of each band will have teeth shaped to produce the desired fastener member.

The invention may be applied to the manufacture of interlocking fastener members for sliding fasteners and Fig. 1 of the accompanying drawing shows a diagrammatic perspective view of the flexible die sections and tunnel-shaped die holder for this purpose. In this case the fastener members are cast or molded direct on to the edge of the fabric tapes or stringers.

Fig. 2 is a schematic view showing one form of filling the die members.

1 is the tunnel-shaped die holder, the opposite walls of which can be squeezed together to grip the flexible die sections 2, 3 and 4 which are internally shaped to suit the shape of the fastener members 6, the top flexible die section 3 being shaped to provide the recess on one side and projection on the other side of each fastener member 6. The fabric tape 5 is fed into the tunnel in the direction of the arrow 7 and emerges from the other end with the members cast on to the one edge as shown in the diagram.

The artificial resin or other fluid or plastic is injected into the mold through holes 8 in the top of the die holder 1, and during the injection period the die sections 2, 3 and 4 (which preferably are continuous) are stopped, and hydraulic or other pressure is brought to bear on all four sides of the die holder and thus upon the portion of the flexible die which is in the holder or tunnel so that no leakage of fluid takes place from the molds.

An important feature of the invention is the way in which the flexible die sections 3 separate from the finished fastener 5, 6, without damaging the recesses or projections on the heads of the cast members 6.

This separation is accomplished as indicated in the diagram, i. e. when the finished fastener emerges from the die holder 1 it is pulled in a downward direction while the flexible die section 3 emerges from the tunnel and moves in an upward direction as indicated by the arrow 30. It will be clear that the finished fastener stringer 5, 6 and the flexible die section 3 are separating in the same manner as the stringers of a sliding fastener separate when the slider is moved to open the fastener.

As mentioned above, the treatment of the material during application to the fabric tape varies in accordance with the type of material being used, and the means for supplying the material to the dies will also depend upon the qualities of the material. For example, in the case of rubber compounds or the cold setting plastics, it will be necessary to shape the material into the form of soft pellets or beads, the volume of which is equal to the finished coupling part. These pellets may be introduced into the dies by any suitable mechanism and there receive the shape of the finished coupling part. In the case of rubber, it will be necessary to apply a suitable degree of heat and pressure to perfect the vulcanizing process and in the case of the thermo-hardening materials, it will also be necessary to apply the proper degree of heat and pressure. For this purpose, the die may be suitably heated and pressure may be exerted upon inwardly movable sides of the die holder.

For the purpose of supplying the thermo-plastic resins to the die, the material is preferably reduced to a highly heated liquid condition so that it can be properly mixed. However, while being applied to the edge of the strip of fabric, it is necessary that the material be relatively cool in order that it will not char the fabric. It is, therefore, desirable to cool the liquid material on its way to the mold and in the mold until it is in a semi-plastic condition. In this manner also the escape of the material through the parts of the mold is avoided.

The device shown schematically in Fig. 2 has a cylinder or container 11, where the material is kept in a liquid condition and from which it is pressed by a piston 12 into the channel 13 which divides into smaller channels 14, which lead to still smaller channels 15, each supplying a die cavity 16.

The warm liquid material on its way to the die becomes plastic owing to the loss of heat in the various channels, and in the mold, and in this way, the molding and fashioning of the parts is effected without causing any damage to the strip of cloth through the heat.

The injection of the casting fluid, feeding of fabric tape, gripping of mold and mold holder, and the movement of the flexible die section may be synchronized to allow the process to be made automatic, thus requiring little attention from the operator.

An important advantage of the above described method of manufacture of fastener members consists in the fact that the most efficient shape of fastener, i. e. with recess on one side and projection on the reverse side, can be employed, as distinct from the usual method of die casting or molding by means of a split plate mold in which case the fastener members can not take this form since the mold, which is rigid can not separate without breaking the castings. Also by the present invention no casting ridge is left on the operative portions of the fastener members.

I claim:

1. Apparatus for making fastener stringers of the kind having fastener elements secured in uniformly spaced relation on the edge of a flexible tape, comprising a die holder having a guideway, continuous series of flexibly connected die sections slidably mounted in said guideway and having cavities shaped to receive a flexible tape and to define mold chambers around the flexible tape for fastener elements, means for supplying moldable material to said mold cavities, and means for connecting the sections of each series to maintain them in uniformly spaced relation.

2. Apparatus for making fastener stringers of the kind having fastener elements secured in uniformly spaced relation on the edge of a flexible tape, which comprises a die holder having a guideway, three continuous series of die sections having component parts adapted to mate together to form a series of mold chambers shaped to form fastener elements, said die sections being slidably mounted in said guideway and having cavities communicating with the mold chambers to receive a flexible tape, and means connecting the elements in each series to maintain them in uniformly spaced relation, said connecting means being flexible whereby each series of die sections is flexed away from the tape to release the molded fastener elements.

GEORGE H. C. CORNER.